H. T. STITH.
Traction-Wheel.

No. 224,741. Patented Feb. 17, 1880.

Witnesses:
Floyd Norris
Howell Bartle

Inventor:
Henry T. Stith
by Johnson & Johnson
Attys

UNITED STATES PATENT OFFICE.

HENRY T. STITH, OF OTTAWA, KANSAS, ASSIGNOR OF ONE-HALF OF HIS RIGHT TO SIMEON H. MERRILL, OF SAME PLACE.

TRACTION-WHEEL.

SPECIFICATION forming part of Letters Patent No. 224,741, dated February 17, 1880.

Application filed August 5, 1879.

*To all whom it may concern:*

Be it known that I, HENRY T. STITH, of Ottawa, in the county of Franklin and State of Kansas, have invented certain new and useful Improvements in Traction-Wheels for Vehicles; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The object of my improvements is to better that class of inventions which essay to furnish a continuous track for street-cars and other vehicles for the usual roads without rails or tramways.

My invention seeks especially to provide a new construction of track for such cars; and it consists of said novel track and its combination with an endless carrying-belt.

Four or more trucks are arranged like wheels, each truck consisting of an endless belt of wheels, three in a group, mounted upon axles, with the middle wheel substantially stationary upon the ground, forming the track and supporting the outer smaller ones, so that the smaller wheels do not touch the ground, but support and form a traveling way for a flanged ellipsoidal frame, which is suitably braced and connected to the axle and truck-frame, causing the large middle wheel to act as the track on a common road, and to be carried up and around the ends of the ellipsoidal frame, and thus propel the vehicle. The groups of wheels, three upon the same axle, are connected by links properly braced and secured.

Figure 1:
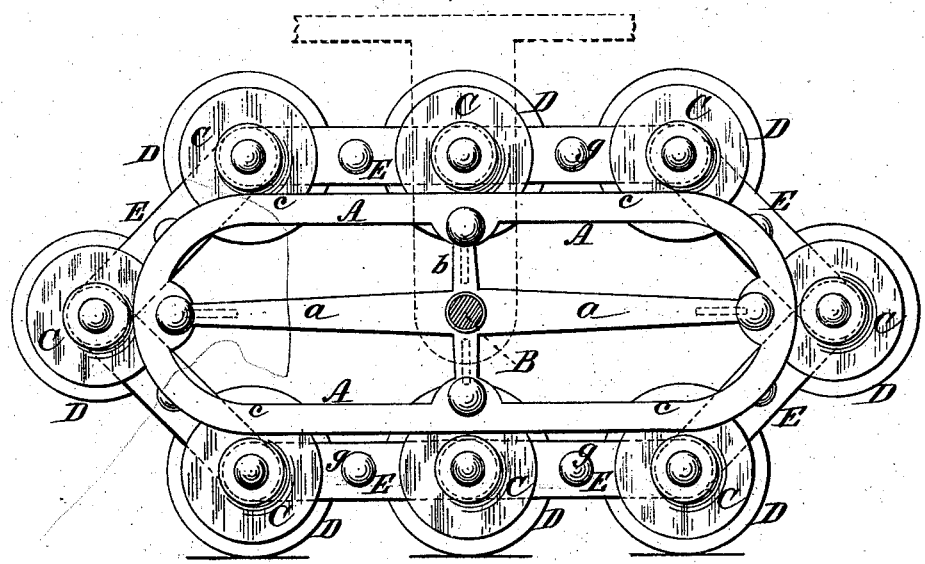
Figure 2:
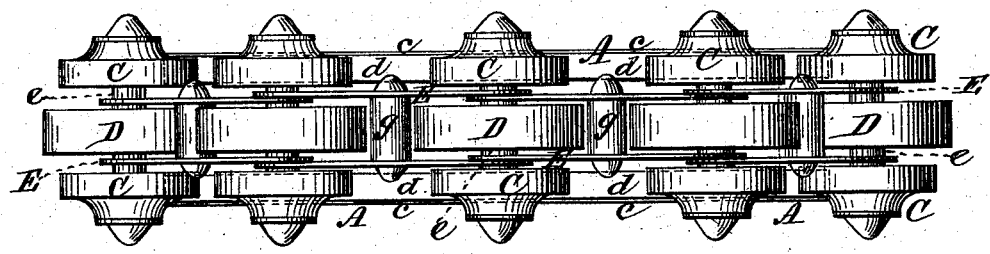
Figure 3:
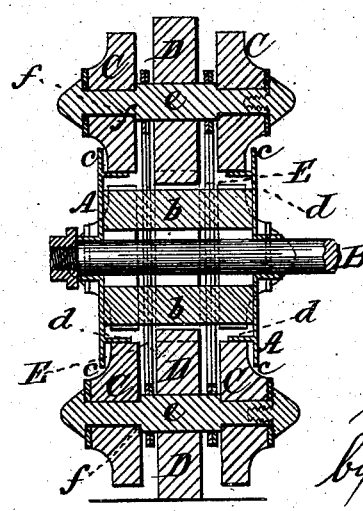

In the accompanying drawings, Figure 1 represents a side elevation of a truck embracing my invention; Fig. 2, a top view, and Fig. 3 a vertical cross-section.

The ellipsoidal frame A is carried by a fixed car-axle, B, connected to the truck-frame by hangers or otherwise. This ellipsoidal frame A consists of two side frames properly braced to preserve its capacity and shape by braces *a b*, and has face flanges *c* for confining the small wheels C to the tread *d*, as said frame travels over the wheels.

The vehicle is propelled by horse or steam power, and the frame A travels over the smaller anti-friction wheels C, which are arranged in groups, the two outer smaller ones being upon each side of an intermediate large wheel, D, all three upon the same axle *e*, and while the frame causes the smaller wheels to revolve, the large wheel remains substantially stationary upon the ground and forms its own track— that is, of every group that is upon the ground, generally three groups at a time. These groups of wheels are connected by an endless chain or belt, E, of links, so that as the car is propelled the frame A travels on the small wheels, and as it progresses all the groups are carried up and around the ellipsoidal frame. The small wheels might have separate bearings; but this is not deemed necessary or desirable.

The large wheels are designed to support the smaller ones and keep them from the ground, and to form of themselves the track; but these large wheels are not intended to revolve. They receive the weight of the car and are made wheel shape, in order to accommodate all unevenness of ground, which a simple shoe or runner would be incapable of doing, and the main advantage of the large wheels lies in this fact and in the fact that, being between the two smaller ones, the truck is always kept balanced.

The small wheels and the large middle wheel are all journaled upon the same axle; but the smaller wheels rest against shoulders *f* on said axle to exclude mud and dust from the bearings.

Curves are easily turned, because the traction or small wheels of one side truck may run faster or slower than those of the other, since they move or revolve independently and do not touch the ground. The weight of the car upon the larger wheels forms the purchase. Bolts *g* between the groups of wheels brace the endless belt of links.

Suitable brakes can be applied upon the sides or tops of the large wheels to stop the movement of the belt of wheels.

I know that a system of trucks, each having a track-forming shoe, has been proposed and covered by Letters Patent, and that said trucks travel upon an ellipsoidal frame; but I have distinctly described my construction, so that my invention may be understood as being a different thing.

I claim—

1. In traction-vehicles adapted to make their own track, the intermediate stationary track-forming large wheel, in combination with the smaller traveling frame-bearing wheels upon each side thereof, substantially as described.

2. In traction-vehicles, the combination of the endless belt of grouped wheels, one large track-forming wheel being between two smaller traveling wheels, with an ellipsoidal frame traveling on said smaller wheels, substantially as described.

3. In traction-vehicles having an ellipsoidal frame traveling upon an endless belt of grouped wheels, as described, a group of three wheels, the middle being the largest, and each wheel revolving independently of the other upon the same axle.

4. In traction-vehicles, groups of wheels connected by an endless belt for the travel of an ellipsoidal frame, each group consisting of a large middle wheel touching and bearing upon the ground at the proper time of revolution of the belt, and flanked on the same axle by two smaller traveling wheels free of the ground, substantially as described.

In testimony that I claim the foregoing I have hereto affixed my signature in the presence of two witnesses.

HENRY T. STITH.

Witnesses:
J. SUMSTINE,
W. S. WHISENAND.